United States Patent
Tai et al.

(10) Patent No.: US 8,865,808 B2
(45) Date of Patent: Oct. 21, 2014

(54) HALOGEN-FREE, FLAME RETARDANT TPU COMPOSITE

(75) Inventors: Xiangyang Tai, Shanghai (CN); Given Jing Chen, Shanghai (CN); Yurong Cao, Shanghai (CN); Li Qiang Fan, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 169 days.

(21) Appl. No.: 13/696,499

(22) PCT Filed: Jun. 3, 2010

(86) PCT No.: PCT/CN2010/073503
§ 371 (c)(1),
(2), (4) Date: Nov. 6, 2012

(87) PCT Pub. No.: WO2011/150567
PCT Pub. Date: Dec. 8, 2011

(65) Prior Publication Data
US 2013/0059955 A1    Mar. 7, 2013

(51) Int. Cl.
*C09K 21/14* (2006.01)
*C08K 3/22* (2006.01)
*C08K 5/521* (2006.01)

(52) U.S. Cl.
CPC ........... *C08K 5/521* (2013.01); *C08K 2201/014* (2013.01); *C08K 3/22* (2013.01); *C08K 2003/2237* (2013.01)
USPC ............................. 524/114; 524/147; 524/127

(58) Field of Classification Search
CPC ... C08K 3/22; C08K 5/521; C08K 2003/2237
USPC ........................................................ 524/114
See application file for complete search history.

(56) References Cited

U.S. PATENT DOCUMENTS

| | | |
|---|---|---|
| 4,144,202 A | 3/1979 | Ashcraft et al. |
| 5,246,783 A | 9/1993 | Spenadel et al. |
| 5,800,624 A | 9/1998 | Smith et al. |
| 6,496,629 B2 | 12/2002 | Ma et al. |
| 6,714,707 B2 | 3/2004 | Rossi et al. |
| 6,777,466 B2 | 8/2004 | Eckstein et al. |
| 6,861,452 B2 | 3/2005 | Tokuyasu et al. |
| 7,417,083 B2 | 8/2008 | Kosaka et al. |
| 8,129,457 B2 | 3/2012 | Falloon et al. |
| 2004/0204511 A1 | 10/2004 | Tokuyasu et al. |
| 2005/0171254 A1 | 8/2005 | Abu-Isa |
| 2005/0285086 A1 | 12/2005 | Kosaka et al. |
| 2005/0288402 A1 | 12/2005 | Kosaka et al. |
| 2007/0221892 A1 | 9/2007 | Falloon et al. |
| 2008/0153935 A1* | 6/2008 | Wuestenenk ................. 521/107 |

FOREIGN PATENT DOCUMENTS

| | | |
|---|---|---|
| CN | 101570632 | 11/2009 |
| EP | 0389768 A2 | 10/1990 |
| EP | 1167429 B1 | 1/2004 |
| EP | 0617079 B2 | 12/2004 |
| EP | 1491580 B1 | 9/2007 |
| JP | 04-368712 | 12/1992 |
| JP | 2006-282854 A | 10/2006 |
| JP | 2007-203726 A | 8/2007 |
| WO | 2005097900 A1 | 10/2005 |
| WO | 2006121549 A1 | 11/2006 |
| WO | 2007031450 A1 | 3/2007 |

* cited by examiner

*Primary Examiner* — Doris Lee
(74) *Attorney, Agent, or Firm* — Whyte Hirschboeck Dudek S.C.

(57) ABSTRACT

Halogen-free TPU compositions comprise in weight percent based on the weight of the composition: A. 1 to 99% thermoplastic polyurethane (TPU), B. 1 to 50% tris(2-butoxyethyl) phosphate (TBEP), C. 1 to 70% metal hydrate, and D. 1 to 70% organic phosphate ester other than tris(2-butoxyethyl) phosphate. These compositions exhibit better smoke suppression as compared with conventional organic phosphate flame retardant TPU compositions such as those based on resorcinol bis(diphenyl phosphate) (RDP) and bisphenol-A bis (diphenyl phosphate) (BPADP) in the absence of TBEP.

10 Claims, No Drawings

HALOGEN-FREE, FLAME RETARDANT TPU COMPOSITE

BACKGROUND OF THE INVENTION

1. Field of the Invention

The invention relates to thermoplastic polyurethane (TPU) composites. In one aspect the invention relates to TPU composites that are halogen-free and flame retardant (HFFR) while in another aspect, the invention relates to TPU composites that are halogen-free, flame retardant and comprise tris (2-butoxyethyl)phosphate (TBEP) or its oligomer, an organic phosphate ester and a metal hydrate.

2. Description of the Related Art

TPU elastomers can have a broad range of flexibility. They can be fabricated by a wide variety of methods from injection molding to extrusion to blow molding. They also offer performance benefits of clarity, abrasion resistance, chemical and hydrocarbon resistance, and load-bearing and tensile strength. Accordingly, they cover many applications which require flame retardancy.

The traditional flame retardants used in TPU compositions are halogen-based, i.e., they contain bromine, chlorine etc. However, due to the ever present concerns for the environment and safety, halogen-free flame retardants are now favored but these can pose a challenge for TPU compositions. Conventional and readily available halogen-free flame retardants, e.g., those based on organic phosphates such as resorcinol bis(diphenyl phosphate) (RDP) and bisphenol-A bis (diphenyl phosphate) (BPADP), do not produce a flame retardant TPU composition that exhibits good smoke suppression. Of continuing interest to the TPU industry is a halogen-free TPU composition that exhibits both good smoke suppression and flame retardancy.

SUMMARY OF THE INVENTION

In one embodiment the invention is a HFFR TPU composition comprising (A) a TPU, particularly a polyether polyurethane, (B) TBEP or an oligomer of TBEP, (C) a metal hydrate, and (D) an organic phosphate ester. In one embodiment, the HFFR TPU composition further comprises one or more additives or fillers such as an anti-drip agent, e.g., triglycidyl isocyanurate (TGIC), an antioxidant, a UV-stabilizer, processing aids and/or a metal oxide, e.g., titanium dioxide.

In one embodiment the invention is a HFFR TPU composition comprising in weight percent based on the weight of the composition:
  A. 1 to 99% TPU,
  B. 1 to 50% TBEP,
  C. 1 to 70% metal hydrate, and
  D. 1 to 70% organic phosphate ester.
In one embodiment the HFFR TPU composition further comprises in weight percent based on the weight of the composition, one or more of:
  E. 0.1 to 10% anti-dripping agent,
  F. 0.1 to 5% additive; and
  G. 0.1 to 10% filler.

In one embodiment the HFFR TPU compositions of this invention are fabricated into insulation or other sheathing products for wire and cable, or into various parts or components for use in the manufacture of automobiles, building and construction materials, artificial leather, electrical appliances, textiles, furniture and information technology devices. These various products can be fabricated by one or more disparate methods including extrusion, foaming and molding.

The invention comprises:
1. A halogen-free TPU composition comprising in weight percent based on the weight of the composition:
  A. 1 to 99% thermoplastic polyurethane (TPU),
  B. 1 to 50% tris(2-butoxyethyl)phosphate (TBEP),
  C. 1 to 70% metal hydrate, and
  D. 1 to 70% organic phosphate ester other than tris(2-butoxyethyl)phosphate;
  wherein the total percentages of all components are 100%.
2. The composition of item 1 in which the TPU is at least one of polyether-based and polyester-based polyurethane and is present in an amount of 15 to 80 wt %.
3. The composition of items 1 or 2 in which the metal hydrate is at least one of aluminum trihydroxide (ATH) and magnesium hydroxide and is present in an amount of 10 to 60 wt %.
4. The composition of any one of items 1-3 in which the organic phosphate ester is at least one of resorcinol bis(diphenyl phosphate) (RDP) and bisphenol-A bis(diphenyl phosphate) (BPADP) and is present in an amount of 5 to 60 wt %.
5. The composition of any one of items 1-4 in which the TBEP is present in an amount of 2 to 30 wt %.
6. The composition of any one of items 1-5 further comprising at least one of an anti-dripping agent, an antioxidant, UV-stabilizer, processing aid and filler.
7. The composition of any one of items 1-6 in which the anti-dripping agent is triglycidyl isocyanurate and is present in an amount of 0.1 to 10 wt %.
8. The composition of any one of items 1-7 further comprising at least one of ethylene vinyl acetate (EVA), polyethylene, polypropylene, ethylene- or propylene copolymer and styrenic block copolymer.
9. An article comprising the composition of any one of items 1-8.
10. The article of Claim 9 in the form of a wire or cable covering.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of components in the composition.

"Wire" and like terms mean a single strand of conductive metal, e.g., copper or aluminum, or a single strand of optical fiber.

"Cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Composition" and like terms mean a mixture or blend of two or more components.

The term "polymer" (and like terms) is a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Halogen-free" and like terms mean that the compositions of this invention are without or substantially without halogen content, i.e., contain less than 2000 mg/kg of halogen as measured by ion chromatography (IC) or a similar analytical method. Halogen content of less than this amount is considered inconsequential to the efficacy of many products, e.g., a wire or cable covering, made from the compositions of this invention.

Thermoplastic Polyurethane (TPU)

The thermoplastic polyurethane used in the practice of this invention is the reaction product of a polyisocyanate (typically a di-isocyanate), one or more polymeric diol(s), and optionally one or more difunctional chain extender(s). "Thermoplastic" as here used describes a polymer that (1) has the ability to be stretched beyond its original length and retract to substantially its original length when released, and (2) softens when exposed to heat and returns to substantially its original condition when cooled to room temperature.

The TPU may be prepared by the prepolymer, quasi-prepolymer, or one-shot methods. The isocyanate forms a hard segment in the TPU and may be an aromatic, an aliphatic, or a cycloaliphatic isocyanate and combinations of two or more of these compounds. One non-limiting example of a structural unit derived from a di-isocyanate (OCN—R—NCO) is represented by formula (I):

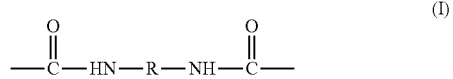
(I)

in which R is an alkylene, cycloalkylene, or arylene group. Representative examples of these di-isocyanates can be found in U.S. Pat. Nos. 4,385,133, 4,522,975 and 5,167,899. Nonlimiting examples of suitable di-isocyanates include 4,4'-di-isocyanatodipheny-1-methane, p-phenylene di-isocyanate, 1,3-bis(isocyanatomethyl)-cyclohexane, 1,4-di-isocyanato-cyclohexane, hexamethylene di-isocyanate, 1,5-naphthalene di-isocyanate, 3,3'-dimethyl-4,4'-biphenyl di-isocyanate, 4,4'-di-isocyanato-dicyclohexylmethane, 2,4-toluene di-isocyanate, and 4,4'-di-isocyanato-diphenylmethane.

The polymeric diol forms soft segments in the resulting TPU. The polymeric diol can have a molecular weight (number average) in the range, for example, from 200 to 10,000 g/mole. More than one polymeric diol can be employed. Nonlimiting examples of suitable polymeric diols include polyether diols (yielding a "polyether TPU"); polyester diols (yielding "polyester TPU"); hydroxy-terminated polycarbonates (yielding a "polycarbonate TPU"); hydroxy-terminated polybutadienes; hydroxy-terminated polybutadiene-acrylonitrile copolymers; hydroxy-terminated copolymers of dialkyl siloxane and alkylene oxides, such as ethylene oxide, propylene oxide; natural oil diols, and any combination thereof. One or more of the foregoing polymeric diols may be mixed with an amine-terminated polyether and/or an amino-terminated polybutadiene-acrylonitrile copolymer.

The difunctional chain extender can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexanedimethanol; hydroquinonebis-(hydroxyethyl)ether; cyclohexylenediols (1,4-, 1,3-, and 1,2-isomers), isopropylidenebis(cyclohexanols); diethylene glycol, dipropylene glycol, ethanolamine, N-methyl-diethanolamine, and the like; and mixtures of any of the above. As noted previously, in some cases, minor proportions (less than about 20 equivalent percent) of the difunctional extender may be replaced by trifunctional extenders, without detracting from the thermoplasticity of the resulting TPU; illustrative of such extenders are glycerol, trimethylolpropane, and the like.

The chain extender is incorporated into the polyurethane in amounts determined by the selection of the specific reactant components, the desired amounts of the hard and soft segments, and the index sufficient to provide good mechanical properties, such as modulus and tear strength. The polyurethane compositions can contain, for example, from 2 to 25, preferably from 3 to 20 and more preferably from 4 to 18, wt % of the chain extender component.

Optionally, small amounts of monohydroxyl functional or monoamino functional compounds, often termed "chain stoppers," may be used to control molecular weight. Illustrative of such chain stoppers are the propanols, butanols, pentanols, and hexanols. When used, chain stoppers are typically present in minor amounts from 0.1 to 2 weight percent of the entire reaction mixture leading to the polyurethane composition.

The equivalent proportions of polymeric diol to said extender can vary considerably depending on the desired hardness for the TPU product. Generally speaking, the equivalent proportions fall within the respective range of from about 1:1 to about 1:20, preferably from about 1:2 to about 1:10. At the same time the overall ratio of isocyanate equivalents to equivalents of active hydrogen containing materials is within the range of 0.90:1 to 1.10:1, and preferably, 0.95:1 to 1.05:1.

In one embodiment the TPU is at least one of polyether-based or polyester-based polyurethane. TPU compositions based on polyether-based polyurethane are preferred.

Nonlimiting examples of suitable TPUs include the PELLETHANE™ thermoplastic polyurethane elastomers available from the Lubrizol Corporation; ESTANE™ thermoplastic polyurethanes, TECOFLEX™ thermoplastic polyurethanes, CARBOTHANE™ thermoplastic polyurethanes, TECOPHILIC™ thermoplastic polyurethanes, TECOPLAST™ thermoplastic polyurethanes, and TECOTHANE™ thermoplastic polyurethanes, all available from Noveon; ELASTOLLAN™ thermoplastic polyurethanes and other thermoplastic polyurethanes available from BASF; and commercial thermoplastic polyurethanes available from Bayer, Huntsman, the Lubrizol Corporation and Merquinsa.

The TPU component of the compositions of this invention can comprise one or more thermoplastic polyurethanes and, optionally, include one or more additional thermoplastic, halogen-free polymers including, but not limited to, ethylene vinyl acetate (EVA), polyethylene, polypropylene, ethylene- or propylene copolymer, styrenic block copolymer, and the like. These other polymers can be dispersed in, discontinuous or co-continuous with the TPU resin phase of the composition.

If present, then the other polymers are typically present in an amount of 0.1 to 50, more typically 0.1 to 15 and even more typically 0.1 to 10, wt %, based on the combined weight of the TPU component and the other polymers.

The TPU typically comprises at least 1, more typically at least 15 and even more typically at least 25, percent by weight (wt %) of the halogen-free TPU composition. The TPU typically comprises not more than 99, more typically not more than 80 and even more typically not more than 65, wt % of the halogen-free TPU composition.

Tris(2-Butoxyethyl) Phosphate (TBEP)

TBEP is a commercially available, light-colored, high-boiling, non-flammable, low viscous and low acidic flame retardant additive known for use in flexible and rigid polyurethane and polyisocyanurate foam, unsaturated polyester resins, polyvinyl chloride, adhesives, elastomers, cellulose acetate, nitrocellulose, epoxy resins and other resins. TBEP may exist as a single molecule or as an oligomer, i.e., a polymer-like material having only a few repeating units. The oligomeric form of TBEP generally has an average of two or more phosphate and/or phosphonate ester units per molecule.

TBEP typically comprises at least 1, more typically at least 2 and even more typically at least 3, wt % of the halogen-free TPU composition. TBEP typically comprises not more than 50, more typically not more than 30 and even more typically not more than 15, wt % of the halogen-free TPU composition.

Metal Hydrate

Suitable metal hydrates for use in the practice of this invention include, but are not limited to, aluminum trihydroxide (also known as ATH or aluminum trihydrate) and magnesium hydroxide (also known as magnesium dihydroxide). The metal hydrate may be naturally occurring or synthetic, and they can be used alone or in combination with one another and/or with other inorganic flame retardants, e.g., calcium carbonate, silica, etc., typically in minor amounts.

The metal hydrate typically comprises at least 1, more typically at least 10 and even more typically at least 20, wt % of the halogen-free TPU composition. The metal hydrate typically comprises not more than 70, more typically not more than 60 and even more typically not more than 55, wt % of the halogen-free TPU composition.

Organic Phosphate Ester

The organic phosphate esters useful in the practice of this invention include both aromatic and aliphatic phosphate esters and their polymers. Examples of aliphatic phosphate ester flame retardants include trimethyl phosphate, tributyl phosphate, tri(2-ethylhexyl) phosphate, tributoxyethyl phosphate, monoisodecyl phosphate and 2-acryloyloxyethylacid phosphate. Examples of aromatic phosphate esters include trixylenyl phosphate, tris(phenylphenyl) phosphate, trinaphthyl phosphate, cresyldiphenyl phosphate, xylenyldiphenyl phosphate and dipheny-2-methacryloyloxyethyl phosphate. Examples of aromatic bis(phosphate esters) include resorcinol bis(diphenyl phosphate) (RDP), resorcinol bis(dixylenyl phosphate), resorcinol bis(dicresylphosphate), hydroquinone bis(dixylenyl phosphate), bisphenol-A bis(diphenyl phosphate) (BPADP) and tetrakis(2,6-dimethylphenyl) 1,3-phenylene bisphosphate. These phosphate esters can be used alone or in combination with one another. Preferred organic phosphate esters include RDP and BPADP.

The organic phosphate ester typically comprises at least 1, more typically at least 5 and even more typically at least 10, wt % of the halogen-free TPU composition. The organic phosphate ester typically comprises not more than 70, more typically not more than 60 and even more typically not more than 20, wt % of the halogen-free TPU composition.

Anti-Dripping Agent

In one embodiment the halogen-free TPU composition of the invention further comprises an anti-dripping agent. Examples include without limitation one or more of triglycidyl isocyanurate, epoxidized novolac resin, and fluoro-based resins such as polytetrafluoroethylene, copolymers of tetrafluoroethylene and hexafluoropropylene, fluorinated carbon resins of tetrafluoroethylene and perfluoroalkylvinylether, polyvinylidenefluoride, and the like.

If present, the anti-dripping agent typically comprises at least 0.1, more typically at least 0.2 and even more typically at least 0.4, wt % of the halogen-free TPU composition. If present, the anti-dripping agent typically comprises not more than 10, more typically not more than 8 and even more typically not more than 5, wt % of the halogen-free TPU composition.

Additives and Fillers

The halogen-free TPU compositions of this invention can, optionally, also contain additives and/or fillers. Representative additives include, but are not limited to, antioxidants, processing aids, colorants, ultraviolet stabilizers (including UV absorbers), antistatic agents, nucleating agents, slip agents, plasticizers, lubricants, viscosity control agents, tackifiers, anti-blocking agents, surfactants, extender oils, acid scavengers, and metal deactivators. If present, these additives are typically used in a conventional manner and in conventional amounts, e.g., from 0.01 wt % or less to 10 wt % or more, based on the total weight of the composition.

Representative fillers include but are not limited to the various metal oxides, e.g., titanium dioxide; metal carbonates such as magnesium carbonate and calcium carbonate; metal sulfides and sulfates such as molybdenum disulfide and barium sulfate; metal borates such as barium borate, metabarium borate, zinc borate and meta-zinc borate; metal anhydride such as aluminum anhydride; clay such as diatomite, kaolin and montmorilonite; huntite; celite; asbestos; ground minerals; and lithopone. If present, these fillers are typically used a conventional manner and in conventional amounts, e.g., from 5 wt. % or less to 50 wt. % or more based on the weight of the composition.

Suitable UV light stabilizers include hindered amine light stabilizers (HALS) and UV light absorber (UVA) additives. Representative HALS that can be used in the compositions include, but are not limited to, TINUVIN XT 850, TINUVIN 622, TINUVIN® 770, TINUVIN® 144, SANDUVOR® PR-31 and Chimassorb 119 FL. TINUVIN® 770 is bis-(2,2,6,6-tetramethyl-4-piperidinyl)sebacate, has a molecular weight of about 480 grams/mole, is commercially available from Ciba, Inc. (now a part of BASF), and possesses two secondary amine groups. TINUVIN® 144 is bis-(1,2,2,6,6-pentamethyl-4-piperidinyl)-2-n-butyl-2-(3,5-di-tert-butyl-4-hydroxybenzyl)malonate, has a molecular weight of about 685 grams/mole, contains tertiary amines, and is also available from Ciba. SANDUVOR® PR-31 is propanedioic acid, [(4-methoxyphenyl)-methylene]-bis-(1,2,2,6,6-pentamethyl-4-piperidinyl)ester, has a molecular weight of about 529 grams/mole, contains tertiary amines, and is available from Clariant Chemicals (India) Ltd. Chimassorb 119 FL or Chimassorb 119 is 10 wt % of dimethyl succinate polymer with 4-hydroxy-2,2,6,6,-tetramethyl-1-piperidineethanol and 90 wt % of N,N'''-[1,2-Ethanediylbis[[[4,6-b is [butyl(1,2,2,6,6-pentamethyl-4-piperidinyl)amino]-1,3,5-traizin-2-yl]imino]-3,1-propanediyl]]bis[N'N''-dibutyl-N'N''-bis(1,2,2,6,6-pentamethyl-4-piperidinyl)]-1, is commercially available from Ciba, Inc. Representative UV absorber (UVA) additives include benzotriazole types such as Tinuvin 326 and Tinuvin 328 commercially available from Ciba, Inc. Blends of HAL's and UVA additives are also effective.

Examples of antioxidants include, but are not limited to, hindered phenols such as tetrakis[methylene(3,5-di-tert-butyl-4-hydroxyhydro-cinnamate)]methane; bis[(beta-(3,5-di-tert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers. Antioxidants can be used, for example, in amounts of 0.1 to 5 wt % based on the weight of the composition.

Examples of processing aids include, but are not limited to, metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; silicone fluids and polysiloxanes.

Compounding/Fabrication

Compounding of the compositions of this invention can be performed by standard means known to those skilled in the art. Examples of compounding equipment are internal batch mixers, such as a Banbury or Bolling internal mixer. Alternatively, continuous single or twin screw mixers can be used, such as a Farrel continuous mixer, a Werner and Pfleiderer twin screw mixer, or a Buss kneading continuous extruder. The type of mixer utilized, and the operating conditions of the mixer, will affect properties of the composition such as viscosity, volume resistivity, and extruded surface smoothness.

The compounding temperature of the TPU with the flame retardants and optional additive packages is typically from 120 to 220° C., more typically from 160 to 200° C. The various components of the final composition can be added to and compounded with one another in any order, or simultaneously, but typically the TPU is first compounded with one or more of the flame retardants before it is compounded with the additives.

In some embodiments the additives are added as a premixed masterbatch. Such masterbatches are commonly formed by dispersing the additives, either separately or together, a small amount of the TPU or, if the TPU is used in combination with another resin, e.g., a polyethylene or polypropylene, with a small amount of the other resin. Masterbatches are conveniently formed by melt compounding methods.

Articles of Manufacture

In one embodiment the halogen-free TPU composition of this invention can be applied as a covering to a cable, e.g., like a sheath or insulation layer, in known amounts and by known methods (for example, with the equipment and methods described in U.S. Pat. Nos. 5,246,783 and 4,144,202). Typically, the polymer composition is prepared in a reactor-extruder equipped with a cable-coating die and after the components of the composition are formulated, the composition is extruded over the cable as the cable is drawn through the die. The sheath is then typically subjected to a cure period which takes place at temperatures from ambient up to but below the melting point of the composition until the article has reached the desired degree of crosslinking. Cure may begin in the reactor-extruder.

Other articles of manufacture that can be prepared from the polymer compositions of this invention, particularly under high pressure and/or elevated moisture conditions, include fibers, ribbons, sheets, tapes, pellets, tubes, pipes, weatherstripping, seals, gaskets, foams, footwear and bellows. These articles can be manufactured using known equipment and techniques.

The TPU compositions of this invention exhibit satisfactory flame resistance performance without using halogenated flame retardants and thus remove environmental and health concerns over combustion of the compositions. The TPU compositions of this invention also exhibit better smoke suppression as compared with conventional organic phosphate flame retardant TPU compositions such as those based on RDP or BPADP in the absence of TBEP.

The invention is described more fully through the following examples. Unless otherwise noted, all parts and percentages are by weight.

SPECIFIC EMBODIMENTS

Materials

The TPUs used in these examples is one of PELLETHANE™ 2103-90 AE and ESTANE™ 58219, both polyether thermoplastic polyurethanes available from Lubrizol Advanced Materials. Before using, the TPU samples are pre-dried at 90° C. for at least 4 hours under vacuum. TBEP is acquired from Zhangjiagang Shunchang Chemical. FYROFLEX® RDP is acquired from Supresta. BPADP is obtained from Adeka Palmarole with the grade name ADK STAB FP600, and it is used as received. Aluminum trihydrate H42M is obtained from Showa Kako, and it is pre-dried at 100° C. for 6 hours under vacuum.

DEN438, a solvent-free, epoxidized novolac with an epoxide equivalent weight of 176-181 and available from The Dow Chemical Company, is used as an anti-dripping agent. TGIC from FangRuiDa and AD-001 (polytetrafluoroethylene in styrene/acrylonitrile copolymer resin) from Ciba Specialty Chemicals, are used as the anti-dripping agents. The antioxidants include IRGANOX® 168 and 1010, and IRGAFOS® 126 and MD1024 all from Ciba Specialty Chemicals. The UV-stabilizer is TINUVIN 866 also from Ciba Specialty Chemicals. The color masterbatch is from Clariant, and the titanium dioxide is R103 from DuPont.

Testing

1. In-House Mimic VW-1

Wire strip for simulated VW-1 testing is prepared by compression molding. Single copper conductor with diameter as 0.5 mm is put into the center of each notch. Hot presser temperature is set at 185° C. Preheating time is about 3 minutes followed with 2 minutes of pressing under 13 MPa. The plaque is cooled to room temperature, and cut into strip specimens (203 mm by 2.5 mm by 2 mm) with a single copper conductor in the center. The specimen is annealed at 23±2° C. and 50±2% relative humidity for at least 24 hours before flame retardant (FR) testing.

Simulated VW-1 FR test is conducted in the UL-94 chamber. The specimen is hung on a clamp with longitudinal axis vertical by applying a 50 gram loading on its bottom end. One paper flag (2 by 0.5 cm) is stuck on the top of the wire. The distance of flame bottom (highest point of the burner oracle) to the bottom of flag is 18 cm. Flame is applied continuously for 45 seconds. After flame time (AFT), uncharred wire length (UCL) and uncharred flag area percentage (flag uncharred) are recorded during and after combustion. Four or five specimen are tested for each sample. Any of the following phenomenon results in a "not pass" score:

1. Cotton under the specimen was ignited;
2. Flag was burned out;
3. Dripping with flame.

2. Cone calorimeter Testing

This test is conducted with an FTT 2000 from Fire Testing Technology (FTT), following ISO 5660-2:2002 (ASTM E-1354). Plaques (100 mm by 100 mm by 3.2 mm) are used for testing with a heat flux of 35 kW/m². Nominal duct flow rate was 24 l/s. Sampling interval is 5 seconds with separation of 25 mm.

Compounding

The compositions reported in Table 1 are prepared on a laboratory Haake from Thermo Scientific with Model-type RHEOMIX™ 600OS. The drive system is HAAKE POLYLAB DRIVE RHEODRIVE 7. Mixing temperature is set at 170° C.

At 30 revolutions per minute (rpm) of mixer rotor speed (with roller type rotor), TPU is added into the mixing bowl and mixed for 2 minutes to reach a homogenous melt state. TBEP, metal hydrate, phosphate ester, anti-drip agent and additives are uniformly pre-mixed and added into the mixing bowl. The feeding process takes approximately 2 minutes, followed by five-minutes of mixing at 70 rpm. After mixing the composite is removed from the mixing bowl and cooled naturally to ambient temperature.

Test Compositions

The TPU composition of Comparative Example 1 comprises organic phosphate ester (RDP) and metal hydrate, but is without TBEP. Comparative Example 2 comprises a metal hydrate and TBEP, but is without an organic phosphate ester. Inventive Examples 1 and 2 comprise all three flame retardant components, i.e., organic phosphate ester, TBEP and metal hydrate.

TABLE 1

Test Compositions and Smoke Density at Compounding Stage

| Component | Comp. Ex. 1 (wt %) | Comp. Ex. 2 (wt %) | Inv. Ex. 1 (wt %) | Inv. Ex. 2 (wt %) |
|---|---|---|---|---|
| PELLETHANE 2103-90AE | 33.6 | 33.6 | 33.6 | 33.6 |
| TGIC | 3.7 | 3.7 | 3.7 | 3.7 |
| ATH | 42 | 42 | 42 | 42 |
| RDP | 14 | | 2 | 10 |
| TBEP | | 14 | 12 | 4 |
| AD-001 | 0.06 | 0.06 | 0.06 | 0.06 |
| Irganox 1010 | 0.6 | 0.6 | 0.6 | 0.6 |
| Irgafos126 | 0.18 | 0.18 | 0.18 | 0.18 |
| Irgafos MD1024 | 0.1 | 0.1 | 0.1 | 0.1 |
| Tinuvin 866 | 0.9 | 0.9 | 0.9 | 0.9 |
| TiO₂ | 4.6 | 4.6 | 4.6 | 4.6 |
| Total | 99.74 | 99.74 | 99.74 | 99.74 |
| Mimic VW-1(pass/total) | 3/3 | 3/5 | 3/3 | 3/3 |
| AFT(sec) sample 1 | 0 | 34 | 2 | 0 |
| sample 2 | 2 | 23 | 0 | 1 |
| sample 3 | 3 | 0 | 5 | 4 |
| sample 4 | | 0 | | |
| sample 5 | | 36 | | |
| UCL(cm) sample 1 | 11 | 0 | 9 | 12 |
| sample 2 | 10 | 4 | 12 | 9 |
| sample 3 | 9.5 | 10.5 | 8 | 10 |
| sample 4 | | 3 | | |
| sample 5 | | 0 | | |
| Flag status (%) sample 1 | 100 | 0 | 100 | 100 |
| sample 2 | 100 | 95 | 100 | 100 |
| sample 3 | 100 | 100 | 100 | 100 |
| sample 4 | | 95 | | |
| sample 5 | | 0 | | |
| Time to burn flag(sec) sample 1 | n.a | 57 | n.a | n.a |
| sample 2 | n.a | n/a | n.a | n.a |
| sample 3 | n.a | n/a | n.a | n.a |
| sample 4 | | n/a | | |
| sample 5 | | 55 | | |
| SEA (m²/kg) from CC | 478.48 | 242.44 | 296.98 | 336.86 |

Note:
Zeros (0) in Table 1 mean that the test was not performed on these samples.

Inventive Examples 1 and 2 are ATH/RDP/TBEP based TPU composites. The results show that Inventive Examples 1 and 2 both pass the mimic VW-1 tests robustly. In addition, specific extinction area (SEA) results from cone calorimeter (CC) testing also show that the Inventive Examples 1 and 2 have a much lower SEA (296.9 m²/g and 336.8 m²/g, respectively) compared to Comparative Example 1 (478.4 m²/g). The compositions of this invention exhibit a much better smoke suppression effect than that of a comparative formulation without TBEP. The results also show that increasing the loading of TBEP decrease the SEA accordingly. Comparative Example 2 is an ATH/TBEP based TPU composite without RDP. Although this example shows very low SEA (242.4 m²/g), it failed to pass the VW-1 test.

Twin-Screw Extruder Compounding and Cable Test

Epoxidized novolac is pre-mixed in the liquid phosphates (BPADP and/or TBEP). Then, in a 50-liter, high speed mixer, all of the fillers (ATH, TiO₂) and additives (anti-dripping agent, antioxidants, etc.) are added and mixed under 1800 rpm for an additional 1 minute. The pre-mixed blends are then removed for next operation.

The pre-mixed blends and TPU resin are then extruded by a twin screw extruder with a barrel temperature under 190° C., a screw diameter of 40 mm and an L/D at 38.6, with an output of approximately 60 kg/hr. Finally, the pellets are obtained and dried at less than 120° C. for 6 hours.

The compositions as described above are then tested as reported in Table 2. All the reported data is based on full cables with an outer diameter of 6.8 mm. The TPU compounds are for jacketing material and the insulation layer used here is DFDA1648 available from The Dow Chemical Company. Specifically, the smoke density test is according to EN50268-2, and to pass this test means that the smoke density (transparency) value is greater than 60%.

The flame retardant package of Comparative Example 3 comprises BPADP and ATH but is without TBEP. The flame retardant package of Inventive Examples 3-5 comprises BPADP, ATH and TBEP.

TABLE 2

Test Compositions, Smoke Density and Mechanical Properties at the Twin-Screw Extruder Stage

| Formulation | Comp. Ex. 3 (wt %) | Inv. Ex. 3 (wt %) | Inv. Ex. 4 (wt %) | Inv. Ex. 5 (wt %) |
|---|---|---|---|---|
| ESTANE ® 58219 TPU | 29.92 | 29.19 | 29.92 | 35.43 |
| Color master batch | 2.00 | 2.00 | 2.00 | 2.00 |
| ADK STAB FP-600 (BDP) | 6.5 | 5.5 | 3.5 | 3 |
| TBEP | 0.00 | 2.00 | 3.00 | 3.50 |
| DEN 431 | 0.50 | 0.50 | 0.50 | 0.50 |
| Showa Denka ATH | 50.00 | 50.00 | 50.00 | 45.00 |
| AD-001 | 0.06 | 0.06 | 0.06 | 0.06 |
| 168 | 0.09 | 0.09 | 0.09 | 0.09 |
| Irganox 1010 | 0.55 | 0.53 | 0.55 | 0.52 |
| TiO$_2$ R103 | 9.33 | 9.11 | 9.33 | 8.90 |
| UV 866 | 1.05 | 1.02 | 1.05 | 1.0 |
| Sum | 100.00 | 100.00 | 100.00 | 100.00 |
| Performance | | | | |
| Smoke density, EN50268-2 | 55.50% | 59.50% | 65.90% | 65.30% |
| VW-1 (pass/total) | 3/3 | 3/3 | 3/3 | 3/3 |
| Tensile strength/Mpa | 8.77 | 9.8 | 8.8 | 8.09 |
| Tensile elongation/% | 155 | 152 | 110 | 188 |
| Aged tensile strength, 80° C. 168 h/Mpa | 12.28 | 12.05 | 10.91 | 9.63 |
| Aged tensile elongation, 80° C.168 h/% | 144 | 150 | 120 | 177 |
| Heat deformation, 80° C. 4 h/% | <5 | <5 | <5 | <5 |

As shown in Table 2, smoke density performance is improved when 2 wt % TBEP is added (Inventive Example 3 versus. Comparative Example 3). The smoke density performance is further improved to pass the criteria (>60%) along with the increment of TBEP dosage (Inventive Examples 4 and 5). However, tensile elongation of Inventive Example 5 drops significantly. This problem can be solved by reducing the loading of ATH and adjusting simultaneously BPADP and TBEP content accordingly (Inventive Example 5). Thus, Inventive Example 5 shows good smoke density performance and balanced mechanical properties. Flame retardant performance is very robust to pass VW-1 for all the formulations in Table 2.

Although the invention has been described with certain detail through the preceding description of the preferred embodiments, this detail is for the primary purpose of illustration. Many variations and modifications can be made by one skilled in the art without departing from the spirit and scope of the invention as described in the following claims.

The invention claimed is:

1. A halogen-free TPU composition comprising in weight percent based on the weight of the composition:
   A. 1 to 99% thermoplastic polyurethane (TPU),
   B. 1 to 50% tris(2-butoxyethyl)phosphate (TBEP),
   C. 1 to 70% metal hydrate, and
   D. 1 to 70% organic phosphate ester other than tris(2-butoxyethyl)phosphate;
   wherein the total percentages of all components are 100%.

2. The composition of claim 1 in which the TPU is at least one of polyether-based and polyester-based polyurethane and is present in an amount of 15 to 80 wt %.

3. The composition of claim 2 in which the metal hydrate is at least one of aluminum trihydroxide (ATH) and magnesium hydroxide and is present in an amount of 10 to 60 wt %.

4. The composition of claim 3 in which the organic phosphate ester is at least one of resorcinol bis(diphenyl phosphate) (RDP) and bisphenol-A bis(diphenyl phosphate) (BPADP) and is present in an amount of 5 to 60 wt %.

5. The composition of claim 4 in which the TBEP is present in an amount of 2 to 30 wt %.

6. The composition of claim 5 further comprising at least one of an anti-dripping agent, an antioxidant, UV-stabilizer, processing aid and filler.

7. The composition of claim 6 in which the anti-dripping agent is triglycidyl isocyanurate and is present in an amount of 0.1 to 10 wt %.

8. The composition of claim 7 further comprising at least one of ethylene vinyl acetate (EVA), polyethylene, polypropylene, ethylene- or propylene copolymer and styrenic block copolymer.

9. An article comprising the composition of claim 1.

10. The article of claim 9 in the form of a wire or cable covering.

* * * * *